(12) United States Patent
Damsi et al.

(10) Patent No.: US 9,744,834 B2
(45) Date of Patent: Aug. 29, 2017

(54) CONVERTIBLE TARP SYSTEM

(71) Applicant: Tarpstop, LLC, Perrysburg, OH (US)

(72) Inventors: Everest Damsi, Perrysburg, OH (US); Kenneth Weschke, Perrysburg, OH (US); Andrew Knepper, Woodville, OH (US)

(73) Assignee: TARPSTOP, LLC, Perrysburg, OH (US)

( * ) Notice: Subject to any disclaimer, the term of this patent is extended or adjusted under 35 U.S.C. 154(b) by 0 days.

(21) Appl. No.: 14/715,664

(22) Filed: May 19, 2015

(65) Prior Publication Data

US 2015/0246601 A1 Sep. 3, 2015

Related U.S. Application Data

(63) Continuation of application No. 13/848,080, filed on Mar. 21, 2013, now Pat. No. 9,033,393.

(60) Provisional application No. 61/613,787, filed on Mar. 21, 2012.

(51) Int. Cl.
*B60J 7/06* (2006.01)
*B60J 7/02* (2006.01)
*B60P 7/04* (2006.01)

(52) U.S. Cl.
CPC ............... *B60J 7/06* (2013.01); *B60J 7/022* (2013.01); *B60J 7/065* (2013.01); *B60P 7/04* (2013.01)

(58) Field of Classification Search
CPC .... B60P 7/04; B60J 7/062; B60J 7/065; B60J 7/102
USPC ......... 296/101, 105, 100.01, 100.11, 100.12, 296/100.13, 100.17, 100.18
See application file for complete search history.

(56) References Cited

U.S. PATENT DOCUMENTS

| | | | | |
|---|---|---|---|---|
| 5,538,313 A * | 7/1996 | Henning | ................ | 296/100.12 |
| 5,924,759 A * | 7/1999 | DeMonte et al. | ....... | 296/100.12 |
| 6,065,796 A * | 5/2000 | Verduyn | ................ | 296/100.12 |
| 6,312,040 B1 * | 11/2001 | Shinohara | ............... | 296/100.12 |
| 7,993,041 B2 * | 8/2011 | Petelka | ................... | 362/485 |
| 2007/0080557 A1 * | 4/2007 | Knepper et al. | ............. | 296/105 |
| 2008/0197664 A1 * | 8/2008 | Lowry et al. | ............ | 296/100.18 |

* cited by examiner

*Primary Examiner* — Jason S Morrow
*Assistant Examiner* — E Turner Hicks
(74) *Attorney, Agent, or Firm* — MacMillan, Sobanski & Todd, LLC (57) ABSTRACT

A convertible tarp system provides an extendable and retractable enclosure especially suited for covering a flatbed trailer. The convertible tarp system includes a plurality of bows and trolleys that support a tarp structure. A guide track defines a longitudinal path of movement and supports the trolleys for movement along the longitudinal path. The guide track is configured to substantially restrict lateral movement of the trolleys along the longitudinal path.

20 Claims, 12 Drawing Sheets

CONVERTIBLE TARP SYSTEM

This application is a continuation patent application of U.S. patent application Ser. No. 13/848,080, filed Mar. 21, 2013, now U.S. Pat. No. 9,033,393, issued May 19, 2015, which claims priority to U.S. Provisional Application No. 61/613,787, filed Mar. 21, 2012. The disclosures of these applications are incorporated herein by reference in their entirety.

BACKGROUND OF THE INVENTION

This invention relates in general to convertible tarp systems, such as can be used to create an enclosed cargo area on a flatbed trailer or the like. In particular, this invention relates to a convertible tarp system having improved guide tracks and corresponding trolley assemblies.

Flatbed trailers are often used to haul loads that are bulky or heavy. These loads often have handling characteristics that rely on access to the open sides of the trailer for loading and unloading. Flatbed trailers provide open access for handling freight but lack a structure for conveniently covering the loads from the elements or for privacy. Tarps are often used to protect freight carried on a flatbed. Sometimes the tarps are applied directly over the loads to guard against the elements. Other flatbed covers rely on bows and other support structures to create a space over the trailer and support one or more tarp sheets. While these structures cover the flatbed trailer and create an enclosed freight hauling space, the structures are difficult or cumbersome to remove in order to gain side access of the trailer for freight handling. Thus, it would be desirable to provide an improved tarp system for protecting and accessing freight.

SUMMARY OF THE INVENTION

This invention relates to a convertible tarp system having improved guide tracks and corresponding trolley assemblies.

In one embodiment, a convertible tarp system has a guide track and a trolley assembly. The guide track is configured to be secured to a trailer. The trolley assembly is supported for movement along the guide track. The trolley assembly includes a pair of support rollers, an intermediate roller, and a pair of guide rollers.

In another embodiment, a convertible tarp system includes at least one bow for supporting a tarp of a trailer. The tarp and bow cooperate to provide an enclosure for cargo. A guide track has a having a channel that defines a path of movement of the bow. A trolley has a pair of spaced apart support wheels that engage the channel and support the bow for longitudinal movement relative to the trailer. The trolley also has at least one guide wheel that supports the bow perpendicular to the path of movement.

In yet another embodiment, a covered trailering system has a flatbed trailer defining a deck space configured to accommodate cargo. A tarp structure covers the deck space and is supported by a plurality of bows that support a covering. The covering defines an enclosed cargo space having a variable volume. The covering may be a flexible tarp sheet of a plurality of generally rigid panels that are arranged to telescope from an extended position to a position wherein the enclosed volume is reduced. A guide track is secured to the flatbed trailer. The guide track has a longitudinally extending channel that includes an outer wall. A plurality of trolleys engage the guide track. Each trolley supports at least one of the plurality of bows. The trolleys have a plurality of support wheels and at least one guide wheel. The plurality of support wheels engage the channel for longitudinal movement relative to the trailer. The at least one guide wheel engages the outer wall of the guide track for lateral support of the bows relative to the trailer.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
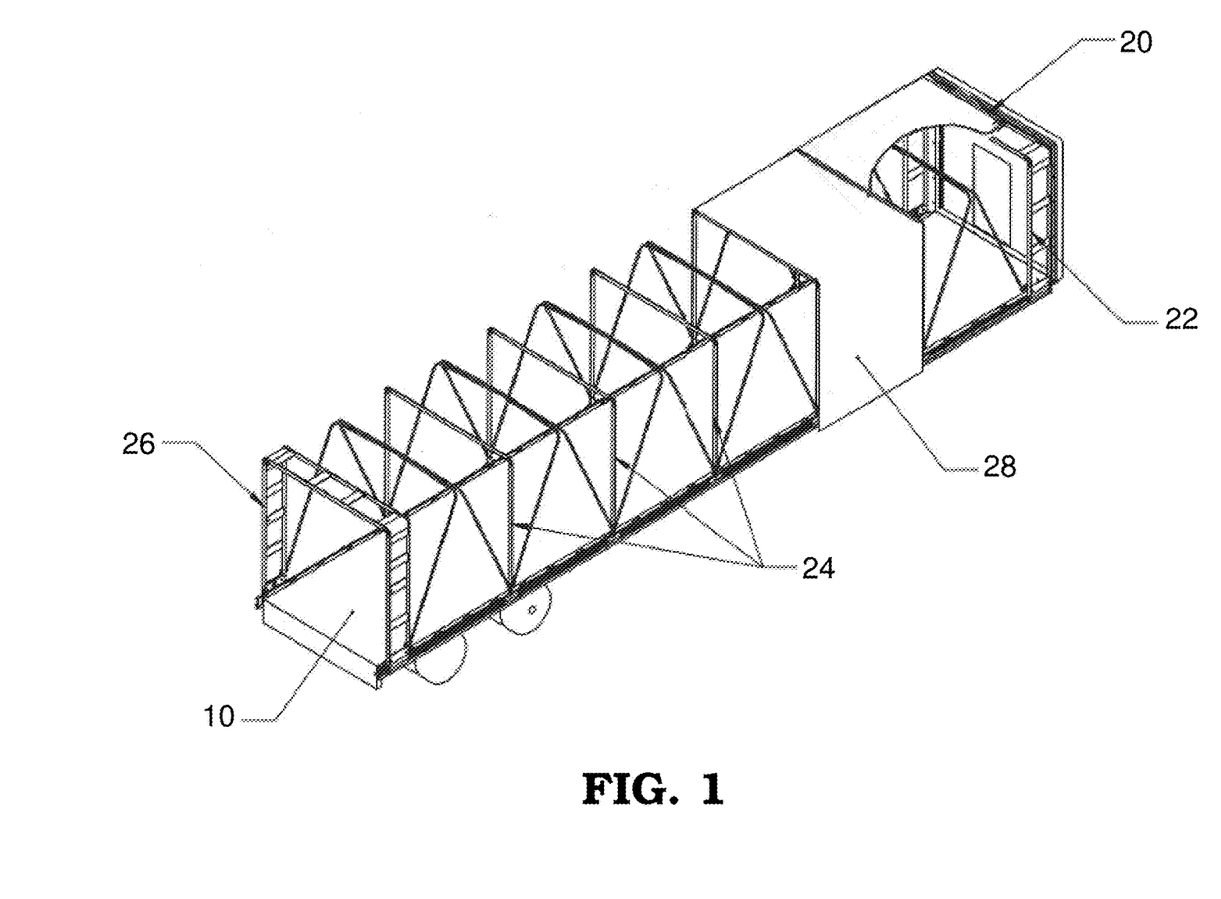
FIG. 1 is a perspective view of a flatbed trailer with a convertible tarp system in accordance with this invention.
Figure 2:
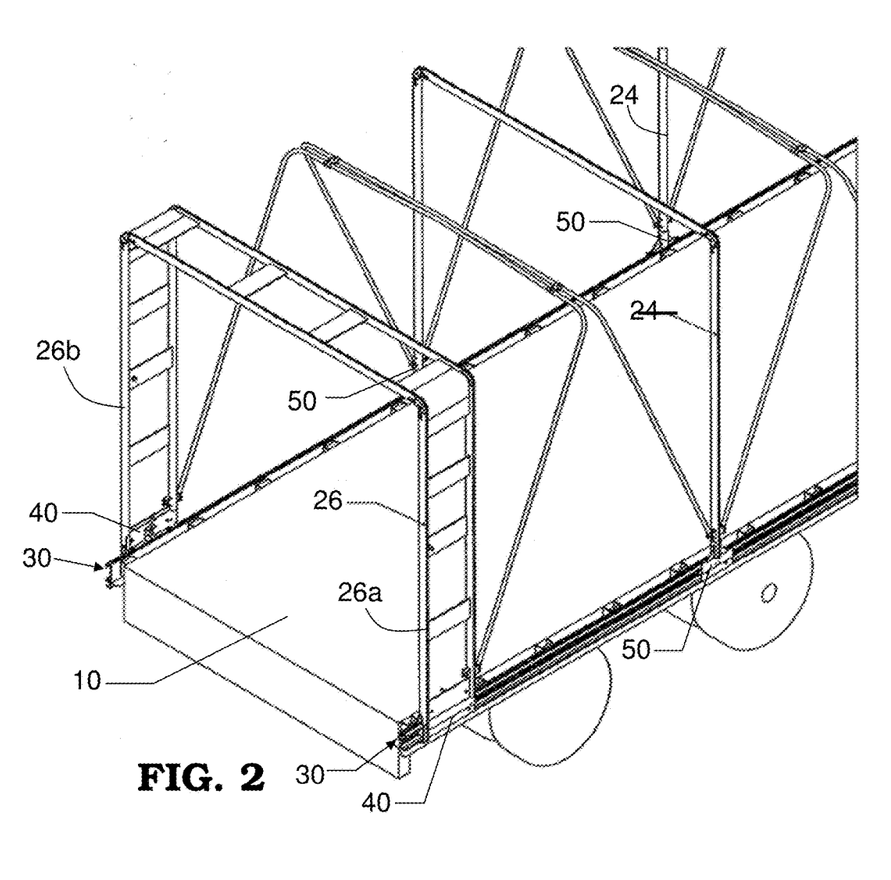
FIG. 2 is an enlarged perspective view of a portion of the flatbed trailer and convertible tarp system as shown in FIG. 1.

Referring now to FIGS. 1 and 2, there is illustrated a flatbed trailer 10 that is partially covered with a convertible tarp system, indicated generally at 20. The illustrated convertible tarp system 20 includes a plurality of bows including a front bow 22, a plurality of intermediate bows 24, and a rear bow 26. A tarp section 28 can be attached between the respective bows 22, 24, and 26 or, alternatively, a single tarp can be stretched along a length of the flatbed trailer 10. The ends of the bows 22, 24, and 26 are supported on a rolling track system that is provided on opposite sides of the flatbed trailer 10. Thus, the convertible tarp system 20 can be extended along a deck of the flatbed trailer 10 to create an enclosed cargo area or can be retracted when not in use. Although the convertible tarp system 20 is illustrated for use with a flatbed trailer 10, it should be appreciated that the tarp system 20 can be used in any desired environment and for any desired purpose. For example, in addition to the trucking industry, the convertible tarp system 20 may also be used in the rail and shipping industries or any other industry.

Words used herein to describe the relative orientation of components, such as upper, lower, left, right, vertical, horizontal, inner, outer, front, rear, and the like are intended to assist the reader in interpreting the drawings and structures relative to how they are illustrated and conventionally observed. Such descriptions are not limited to an absolute coordinate system, unless specifically defined herein, and are merely descriptive aids to describe and define the various embodiments disclosed herein.

Figure 4A:
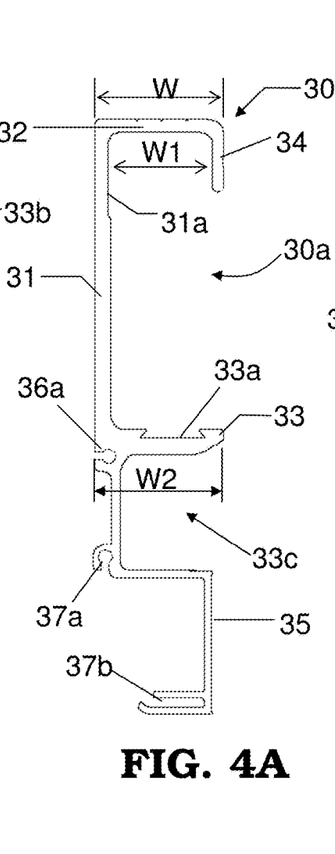
FIG. 4A is an end view of the guide track shown in FIG. 3.
Figure 4B:
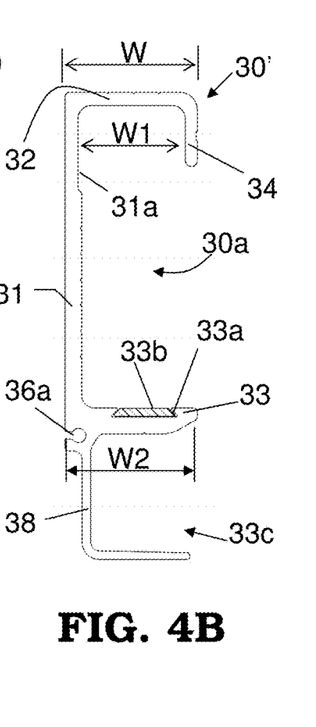
FIG. 4B is an end view of a second embodiment of a guide track, similar to the guide track of FIG. 4A.
Figure 5:
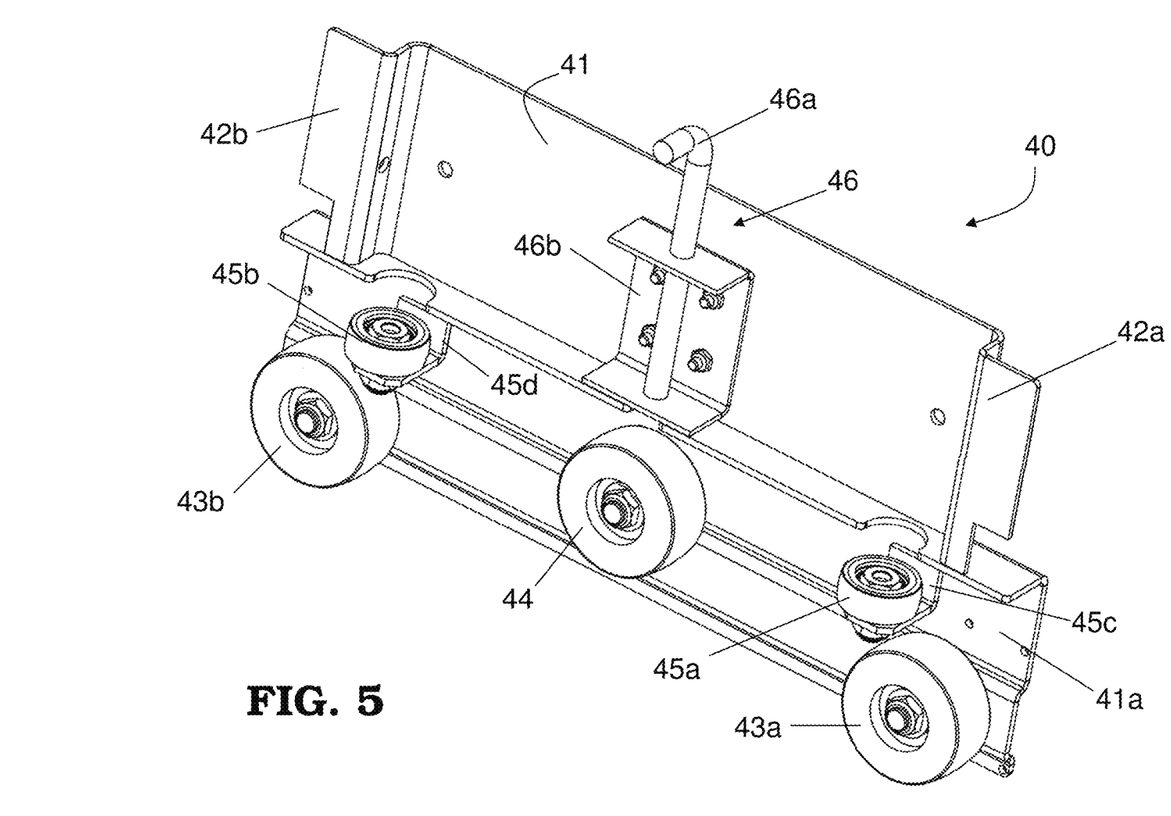
FIG. 5 is an enlarged perspective view of a first embodiment of a rear trolley assembly shown in FIG. 2.
Figure 6:
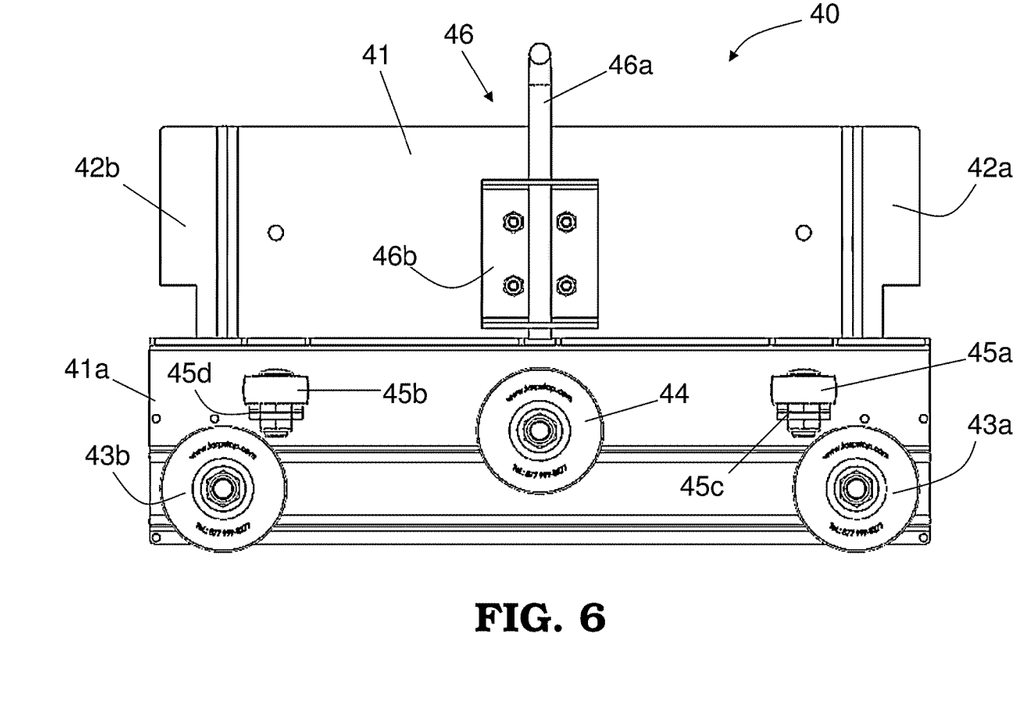
FIG. 6 is a front view of the rear trolley assembly shown in FIG. 5.
Figure 7:
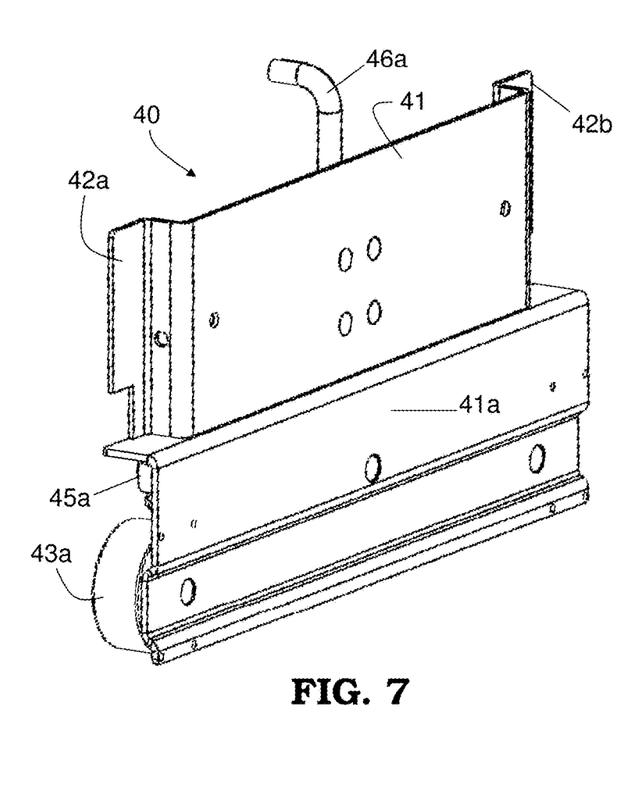
FIG. 7 is a perspective view of an outer side of the rear trolley assembly shown in FIG. 5.
Figure 8:
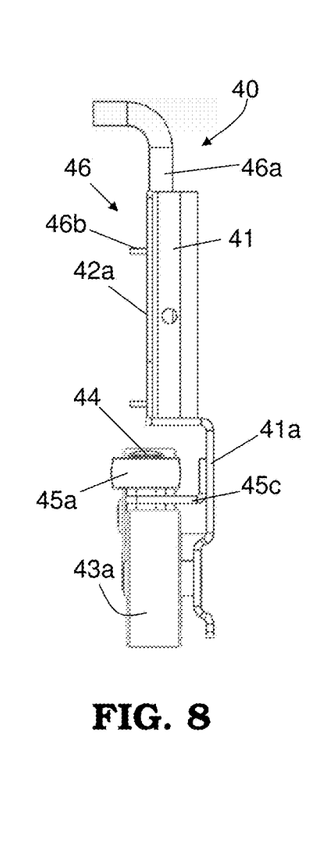
FIG. 8 is an end view of the rear trolley assembly shown in FIG. 5.

The illustrated convertible tarp system 20 includes a pair of guide tracks 30 that respectively extend along opposite sides of the flatbed trailer 10. As shown in FIGS. 4A and 4B, two embodiments of guide tracks 30 and 30' are described. The same reference numbers are used to describe parts that are the same between the two embodiments. The guide tracks 30 and 30' can be secured to the sides of the flatbed trailer 10 in any manner. For example, the guide tracks 30 can be removably supported on the flatbed trailer 10 using a plurality of threaded fasteners, support brackets, spacers, or any other support hardware. Alternatively, the guide tracks 30 can be permanently secured to the flatbed trailer 10 using welded connections or the like. The illustrated guide tracks 30 are preferably similar to one another, although such is not required. Therefore, only one of the guide tracks 30 will be described in further detail.

Figure 3:
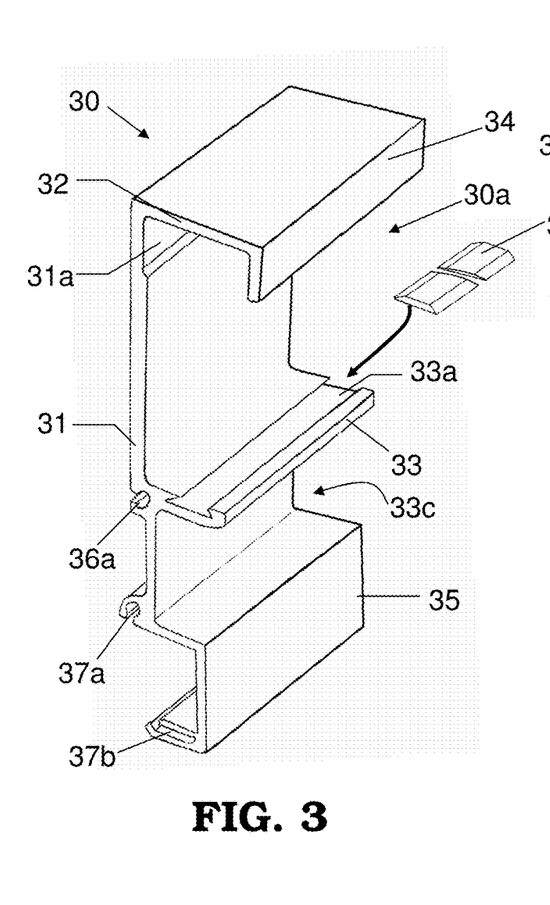
FIG. 3 is an enlarged perspective view of a portion of a guide track shown in FIG. 2.

Referring now to FIGS. 3, 4A and 4B, the illustrated guide tracks 30 and 30' include a vertical back wall 31. An upper wall 32 and a lower wall 33 horizontally extend outwardly from the back wall 31 so as to generally overlap one another. An outer wall 34 vertically extends downwardly from the upper wall 32 and is parallel with the back wall 31. Thus, the back wall 31, the upper and lower walls 32 and 33, and the outer wall 34 define a channel 30a having a C-shape configuration. It should be appreciated, however, that the guide track 30 can define a channel having any cross-sectional shape or configuration. As will be explained below, the C-shaped channel 30a opens away from the flatbed trailer 10 when the guide track 30 is secured thereto. The C-shaped channel provides a track that permits selective longitudinal movement of the assembled tarp structure and restricts lateral (side to side) movement of the tarp structure relative to the trailer.

The illustrated guide track 30 also includes a recessed portion 31a that extends along an inner surface of the back wall 31 near the upper wall 32, although such is not required. The recessed portion 31a increases the internal width W1 of the channel between the back wall 31 and the outer wall 36 without increasing the overall width W of the guide track 30. The internal width W1 may provide clearance for guide rollers, associated with the various trolley assembly embodiments described herein, for free movement of the trolleys within the guide track 30. This permits use of a larger guide wheels for added stability, durability, and reduced rolling resistance. The generally constant overall width W of the guide track 30 provides a generally flat surface of the back wall 31 for ease of mounting and leveling the guide track 30 relative to a side of the flat bed trailer 10. The lower wall 33 defines a width W2 that is less than the overall width W of the guide track 30. This smaller width W2 protects the lower wall from impacts such as from fork lifts during loading and unloading events. Thus, the width difference between the lower wall, which supports the support wheels of the trolleys, and the outer dimension W of the guide track shields the lower wall from damage to permit smooth operation of the trolleys during tarp movement.

Further, the illustrated lower wall 33 includes a groove 33a that extends along an upper surface thereof, although such is not required. The illustrated groove 33a has a dove-tail shape, when viewed in cross section, but may alternatively have any other shape or configuration. The groove 33a is configured to accept and retain a wear strip 33b. In the illustrated embodiments of FIGS. 3 and 4B, the wear strip has a mating dove-tail shape and may be a slip fit, press fit, or molded-in-place fit with the groove 33a. The wear strip 33b may be retained by friction, fasteners, tape, adhesive, and the like. The wear strip 33b provides a surface for guide rollers to ride against during movement of the bows 22, 24, and 26. The wear strip 33b may be made of a hard metal or plastic material for wear resistance, reduced friction and/or corrosion resistance. In one embodiment, the wear strip 33b is a removable polymer strip, configured for replacement when excessively worn.

Referring to FIG. 4A, the illustrated guide track 30 may also include a light bar 35. The illustrated light bar 35 extends along a bottom portion of the guide track 30 and defines a housing-like structure having an opening along a back side thereof. The light bar 35 is configured to house lights, such as individual lights or a string of lights (not shown), along a length of the guide track 30. The light bar 35 is not limited to the illustrated structure but can be alternatively configured in any suitable manner. The guide track 30 may also include one or more retaining grooves 36a and 37a to retain various protective coverings or splash guards, as will be explained below. As shown in FIG. 4B, the guide track 30' is formed without the light bar 35 and the retaining groove 37a. A lower flange 38 is an L-shaped flange that supports the optional retaining groove 36a and extends outwardly to further deflect debris and ice accumulation near where the trolley and guide track interface. The lower flange 38 and the lower wall 33 act together to form a sealing space 33c that acts as a dead air space. The sealing space 33c is configured such that a lip of the tarp covering (not shown) extends into the space to prevent or slow the progression of dirt, air and other road contaminants entering into the trailer. The light bar 35, when provided, also acts to prevent debris and ice build up on the interface of the trolleys and the guide track 30.

Figure 12:
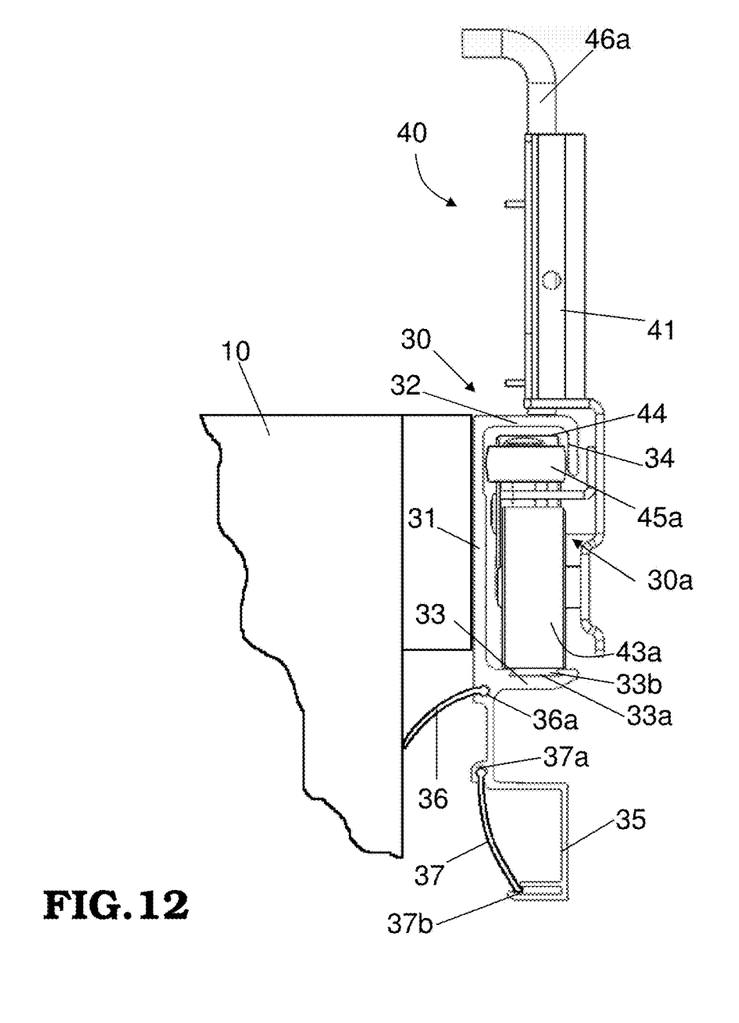
FIG. 12 is an enlarged end view of a portion of the convertible tarp system shown in FIG. 2.

As shown in FIG. 12, the guide track 30 may optionally include a splash guard 36. The splash guard 36 is a flexible member that is secured to the guide track 30 and extends therefrom for contact with the side of the flatbed trailer 10. For example, the illustrated splash guard 36 includes an enlarged edge that is inserted and secured within the retaining groove 36a that is formed in the guide track 30. Alternatively (or in addition), the splash guard 36 can be adhered to the guide track 30 or secured thereto in any other manner. The splash guard 36 can be made from any flexible material, such as a rubber or polymer-based material.

If the guide track 30 includes the light bar 35, as shown in FIG. 4A, then the guide track 30 may include a second splash guard 37 as shown in FIG. 12. The second splash guard 37 is also a flexible member that is configured to enclose the opening in the back side of the light bar 35. For example, the illustrated second splash guard 37 includes an enlarged edge that is inserted and secured within the retaining groove 37a that is formed in an upper portion of the light bar 35. An opposite edge of the second splash guard 37 is inserted into a retaining slot 37b, that provides a space between spaced apart lips to retain the splash guard opposite end. As shown in FIGS. 3, 4, and 12, the retaining slot may be provided along a lower portion of the light guard 35. Alternatively (or in addition), the second splash guard 37 can be adhered to the light bar 35 or secured thereto in any other manner. Alternatively, the first and second splash guards 36 and 37 may formed as a single component if desired. The second splash guard 37 can be made from any flexible material, such as a rubber or polymer-based material.

As shown in FIG. 2, the rear bow 26 is supported on the guide track 30 by a rear trolley assembly 40. Although not illustrated, it should be appreciated that the front bow 22 may also be supported on the guide track 30 by a front trolley assembly that, in one embodiment, is preferably similar to the illustrated rear trolley assembly 40. Therefore, only the rear trolley assembly 40 will be further described and illustrated.

Referring now to FIGS. 5 through 8, the rear trolley assembly 40 includes a vertical base member 41. The illustrated base member 41 includes a pair of support members 42a and 42b that vertically extend along opposite edges thereof. The illustrated support members 42a and 42b form an L-shape configuration but may alternatively define any shape or configuration such as a square or other polygonal shape. As shown in FIG. 2, the support members 42a and 42b are configured to support the ends of a pair of spaced apart bow members 26a and 26b that form part of the rear bow 26, as shown in FIG. 2. The ends of the bow members 26a and 26b can be removably secured to the support members 42A and 42B using threaded fasteners, pins, or any other support hardware. Alternatively, the ends of the bow members may be permanently secured to the support members 42A and 42B using a welded connection or the like.

Referring back to FIGS. 5 through 8, the rear trolley assembly 40 further includes a pair of support rollers 43a and 43b that are vertically oriented and supported on an inner surface of the base member 41, that may face the trailer 10. The illustrated support rollers 43a and 43b are generally co-planar with one another and spaced apart along a lower edge 41a of the base member 41. The lower edge 41a may include various offsets, bends, or ribs to provide mounting surfaces or increase stiffness of the trolley 40. A portion of the outer circumference of the support rollers 43a and 43b extends below the lower edge of the base member 41 to movably support the rear trolley assembly 40 on the guide track 30 (see FIG. 12). The support rollers 43a and 43b can be secured to the base member 41 by studs, threaded fasteners, or any other support hardware. The support rollers 43a and 43b can have any dimensions and may be made from any material, such as a rubber or a polymer-based material.

The illustrated rear trolley assembly 40 further includes an intermediate roller 44 that is vertically oriented and supported on the inner surface of the base member 41. As shown, the intermediate roller 44 is located between the support rollers 43a and 43b along the base member 41. Additionally, the illustrated intermediate roller 44 is also located a vertical distance above the support rollers 43a and 43b. The intermediate roller 44 may, alternatively, be aligned in the same vertical plane with the support rollers 43a and 43b, or may extend any distance from the base member 41. The illustrated intermediate roller 44 has the same diameter as the support rollers 43a and 43b and can be made from a similar material, although such is not required. The intermediate roller 44 provides stability for the trolley and attached bows, relative to the guide track 30, as will be explained below.

The illustrated rear trolley assembly 40 further includes a pair of guide rollers 45a and 45b that extend from the inner surface of the base member 41. In the illustrated embodiment, the guide rollers 45a and 45b are oriented along a horizontal plane. For example, the guide rollers 45a and 45b can each be supported on support brackets 45c and 45d that extend horizontally outwardly from the inner surface of the base member 41 toward the guide track 30. Alternatively, the support brackets 45c and 45d may be a singular bracket, or a tab that is stamped out of and bent away from the base member 41. The guide rollers 45a and 45b can be secured to the support brackets 45c and 45d using studs, threaded fasteners, or any other support hardware. As shown, the guide rollers 45a and 45b are located a vertical distance above the support rollers 43a and 43b. The illustrated guide rollers 45a and 45b are smaller in diameter than the support rollers 43a and 43b. However, the guide rollers 45a and 45b can have any dimensions or may be made from any desired material.

The illustrated rear trolley assembly 40 also includes a track stop assembly 46, although such is not required. The illustrated track stop assembly 46 is illustrated to include locking member, such as a pin 46a or the like, that is movably supported relative to the base member 41 by a bracket 46b or the like. As shown in FIG. 12, an end portion of the pin 46a is biased into engagement with the upper wall 32 of the guide track 30 when the rear trolley assembly 40 is assembled therewith. The upper wall 36 may include a plurality of apertures, detents, or pockets (not shown) configured to accept the pin 46a and retain the location of the trolley 40 relative to the guide track 30, though such is not required. The pin 46a may cooperate with a spring member (not shown), such as a coil spring, hairpin spring, Belleville washer or any other biasing member to bias the pin 46a into engagement with the guide track 30. The spring (not shown) may react between the pin 46a and the bracket 46b to bias the pin 46a toward the guide track 30. Thus, the pin 46a is configured to automatically extend into an aperture (not shown) that is provided in the upper wall 32 of the guide track 30 when the rear trolley assembly 40 reaches a desired position. The bracket 46b may be a generally C-shaped bracket or may be two cooperating tanks that are attached to or formed from the base member 41.

Figure 9:
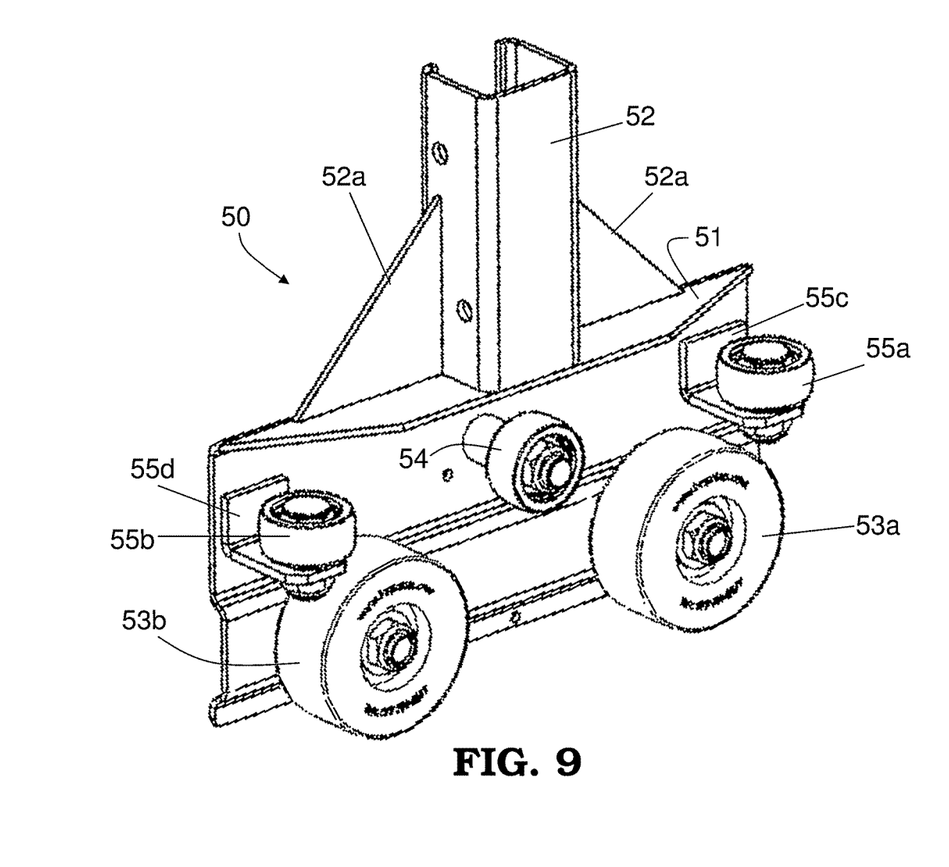
FIG. 9 is an enlarged perspective view of an intermediate trolley assembly shown in FIG. 2.
Figure 10:
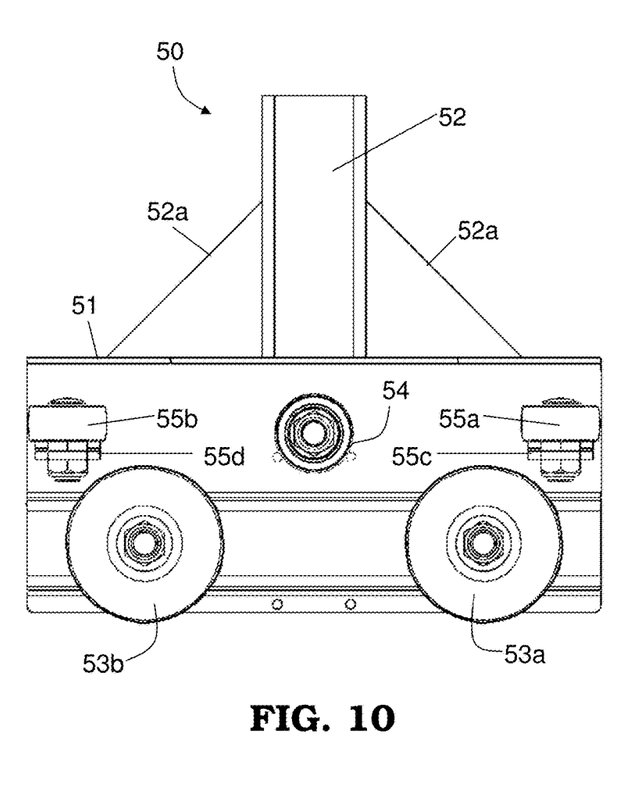
FIG. 10 is a front view of the intermediate trolley assembly shown in FIG. 9.
Figure 11:
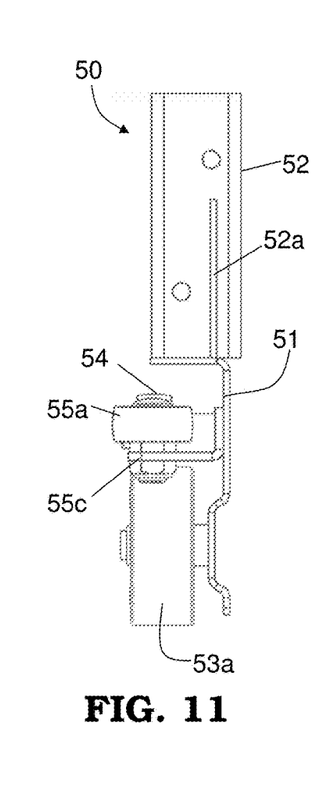
FIG. 11 is an end view of the intermediate trolley assembly shown in FIG. 9.

As shown in FIG. 2, the intermediate bows 24 of the convertible tarp system 20 are each supported on the guide track 30 by an intermediate trolley assembly 50. Referring now to FIGS. 9 through 11, the illustrated intermediate trolley assembly 50 includes a vertical base member 51. A support member 52 extends upwardly from an upper surface of the base member 51 and may be generally, centrally located along a length thereof. As shown, a pair of angled support brackets or gussets 52a may be included to provide additional support for the support member 52, although such is not required. The illustrated support member 52 defines a square or polygonal sleeve-like structure, but may alternatively define any shape or configuration. As shown in FIG. 2, the support member 52 is configured to support an end of the intermediate bow 24. The end of the intermediate bow 24 can be removably secured to the support member 52 using threaded fasteners, pins, or any other support hardware. Alternatively, the end of the intermediate bow 24 may be permanently secured to the support member 52 using a welded connection or the like.

Referring back to FIGS. 9 through 11, the intermediate trolley assembly 50 further includes a pair of support rollers 53a and 53b that are vertically oriented and supported on an inner surface of the base member 51. The illustrated support rollers 53a and 53b are generally co-planar with one another and spaced apart along a lower edge of the base member 51. A portion of the outer circumference of the support rollers 53a and 53b extends below the lower edge of the base member 51 to movably support the intermediate trolley assembly 50 on the guide track 30 (see FIG. 12). The support rollers 53a and 53b can be secured to the base member 51 by studs, threaded fasteners, or any other support hardware. The support rollers 53a and 53b can have any dimensions and may be made from any material, such as a rubber or a polymer-based material.

The illustrated intermediate trolley assembly 50 further includes an intermediate roller 54 that is vertically oriented and supported on the inner surface of the base member 51. As shown, the intermediate roller 54 is located between the support rollers 53a and 53b along the base member 51. Additionally, the illustrated intermediate roller 54 is located a vertical distance above the support rollers 53a and 53b. Alternatively, the intermediate roller 54 can be aligned in the same vertical plane with the support rollers 53a and 53b, or may extend any other distance from the base member 51. The illustrated intermediate roller 54 has a smaller diameter than the support rollers 53a and 53b and can be made from a similar material, although such is not required. The intermediate roller 54 cooperates with the support rollers 53a and 53b and with the guide track 30 to provide stability, free movement, and support of the bows 24, as will be explained below.

The illustrated intermediate trolley assembly 50 further includes a pair of guide rollers 55a and 55b that extend from the inner surface of the base member 51. However, the illustrated guide rollers 55a and 55b are oriented along a horizontal plane. For example, the guide rollers 55a and 55b can each be supported on support brackets 55c and 55d that extend horizontally and outwardly from the inner surface of the base member 51. Alternatively, the support brackets 55c and 55d may be a singular bracket, or a tab that is stamped out of and bent away from the base member 51. The guide rollers 55a and 55b can be secured to the support brackets 55c and 55d using studs, threaded fasteners, or any other support hardware. As shown, the guide rollers 55a and 55b are located a vertical distance above the support rollers 53a and 53b. The illustrated guide rollers 55a and 55b are smaller in diameter than the support rollers 53a and 53b. However, the guide rollers 55a and 55b can have any dimensions or may be made from any desired material.

Referring now to FIG. 12, the assembly of the convertible tarp system 20 will be explained in conjunction with the rear trolley assembly 40. It should be understood that the other trolley embodiments described herein may cooperate with the guide track 30 in a similar manner. The guide track 30 is initially secured to the side of the flatbed trailer 10 as described above. The rollers on the rear trolley assembly 40 are inserted within the channel 30a of the guide track 30. For example, the support rollers 43a and 43b (not shown) ride along the wear strip 33a of the lower wall 33 of the guide track 30 to support the weight of the rear trolley assembly 40 and the attached rear bow 26 (not shown). The intermediate roller 44 is configured to contact a surface of the upper wall 32 to prevent or reduce the rear roller assembly 40 from tilting relative to the guide track 40 as the convertible tarp system 20 is tightened. The guide rollers 45a and 45b (not shown) are positioned between the back wall 31 and the outer wall 34 to help guide the rear trolley assembly 40 along the guide track 30 and to facilitate alignment therebetween. The recessed portion 31a that is provided along the inner surface of the back wall 31 enables the guide rollers 45a and 45b to have increased diameters without increasing the overall dimensions of the guide track 30. Also, the groove 33a, formed in the lower wall 33, secures the wear strip 33b and helps to maintain contact between the support rollers 43a and 43b and the lower wall 33 of the guide track 30. It should be appreciated that the intermediate trolley assembly 50 (not shown) is similarly assembled with the guide track 30 and functions in generally the same manner as the illustrated rear trolley assembly 40.

As shown in FIGS. 1 and 2, the bows 22, 24, and 26 may be respectively secured to the trolley assemblies 40 and 50 either before or after the trolley assemblies 40 and 50 are assembled on the guide track 30. Once the trolley assemblies 40 and 50 and the respective bows 22, 24, and 26 are assembled to the guide track 30, the tarps sections 28 can be attached to the respective bows 22, 24, and 26 to complete the convertible tarp system 20.

Figure 13A:
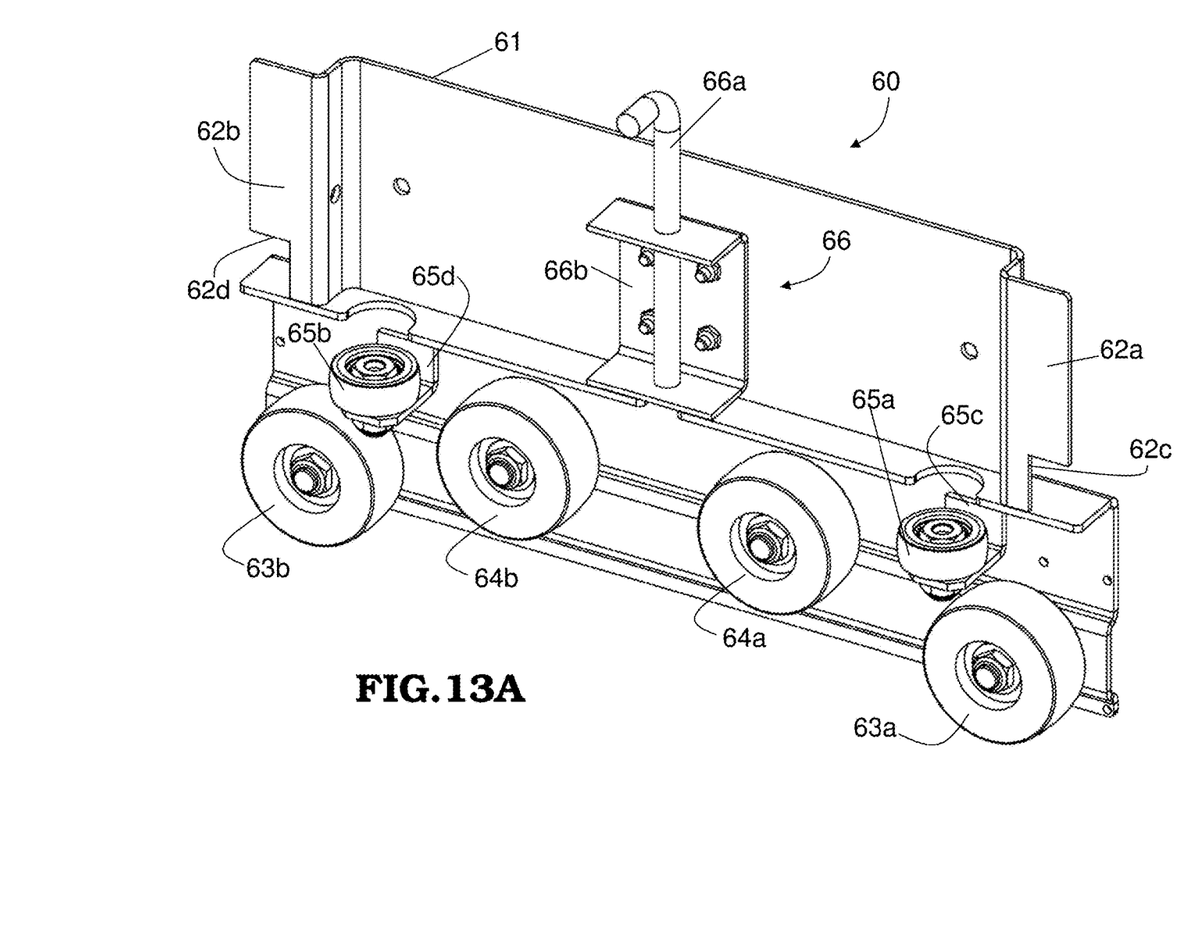
FIG. 13A is a second embodiment of a rear trolley assembly, similar to the rear trolley assembly of FIG. 5.
Figure 13B:
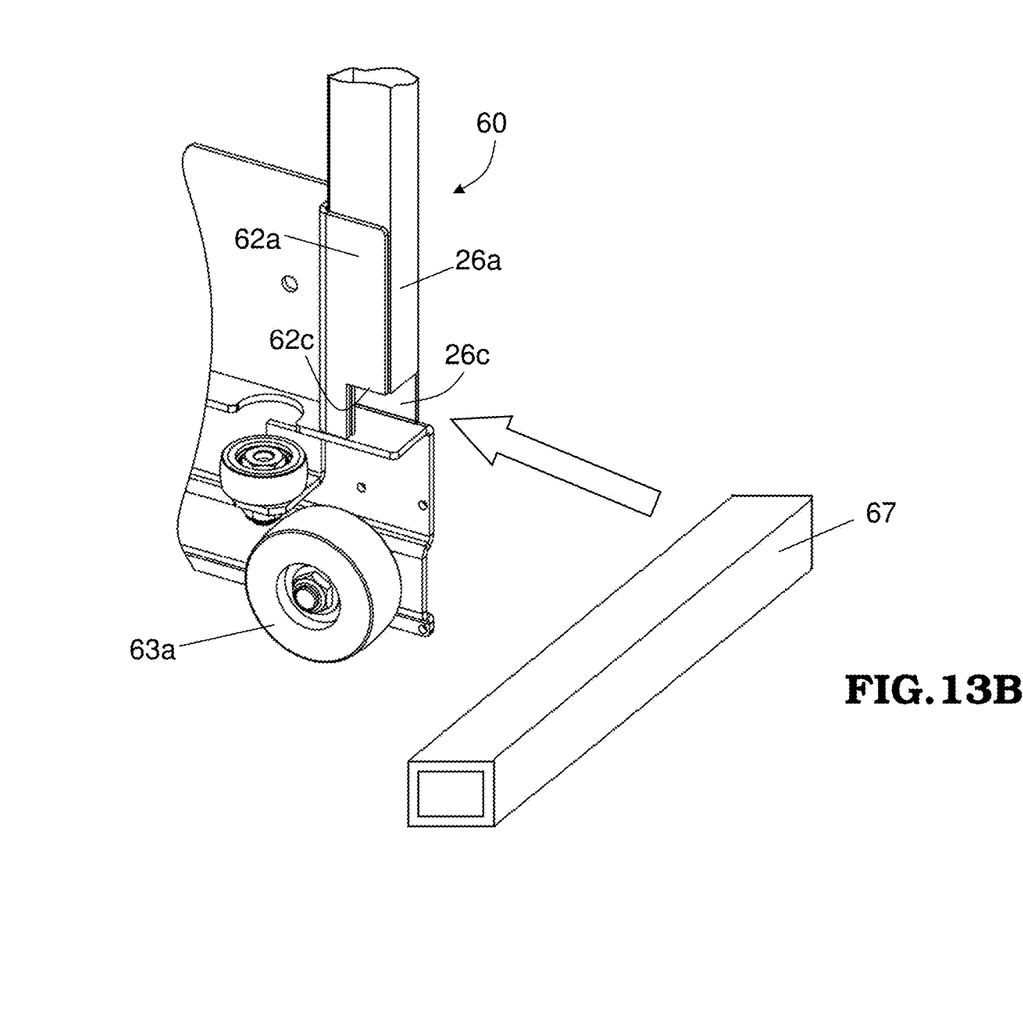
FIG. 13B is an exploded view of the rear trolley assembly of FIG. 13A and a back bow connection.

Referring now to FIGS. 13A and 13B, there is illustrated a second embodiment of a front or rear trolley, shown generally at 60. The trolley will be described in the context of a rear trolley 60, and may share similar components to the rear trolley 40, though such is not required. The rear trolley 60 includes a base member 61 and a pair of L-shaped support members 62a and 62b, similar to the rear trolley 40 described above. The rear trolley 60 may also include a track stop assembly 66 having a locking member, such as a pin 66a, and a bracket 66b. The support members 62a and 62b are configured to support the ends of bow members 26a and 26b and include cutouts 62c and 62d. In the illustrated embodiment, the support members 62a and 62b are configured as mirror images, though such is not required. The characteristic of mirror-imaged support members 62a and 62b permits the trolleys to be reversed which provides economies since one part design may be mounted in each of the four corner positions of the trailer. The ends of the bow members 26a and 26b (not shown) may be removably or permanently secured thereto and may include a corresponding cutout 26c such that a space is formed in the assembled bow and trolley to accommodate a back bow 67. The back bow 67 may provide an anchor point for a back tarp flap (not shown).

The rear trolley 60 further includes a pair of support rollers 63a and 63b and a pair of intermediate rollers 64a and 64b. The support rollers 63a and 63b vertically oriented and supported on an inner surface of the base member 61, that may face the trailer 10. The illustrated support rollers 63a and 63b are generally co-planar with one another and spaced apart along a lower edge 41a of the base member 41. The lower edge 61a may include various offsets, bends, or ribs to provide mounting surfaces or increase stiffness of the trolley 60. A portion of the outer circumference of the support rollers 63a and 63b may extend below the lower edge of the base member 61 to movably support the rear trolley assembly 60 on the guide track 30. Alternatively, the support rollers may extend above the base member 61 to accommodate a wear plate, similar to wear strip 33b, described above. The spaced apart intermediate rollers 64a and 64b are located a vertical distance above the support rollers 63a and 63b. The intermediate rollers 64a and 64b may, alternatively, be aligned in the same vertical plane with the support rollers 63a and 63b, or may extend any distance from the base member 61. The illustrated intermediate rollers 64a and 64b have the same diameter as the support rollers 63a and 63b and can be made from a similar material, although such is not required. The intermediate rollers 64a and 64b are illustrated in a spaced apart relationship from each other that is farther apart than their distance to the support rollers 63a and 63b. The intermediate rollers 64a, 64b and support rollers 63a, 63b cooperate to provide stability for the trolley 60 and attached bows 26a and 26b, relative to the guide track 30. The arrangement of the rollers provides a reactionary moment that resists bending of the bows 22 and 26 in a fore and aft direction relative to the trailer 10, shown in FIGS. 1 and 2. The rear trolley 60 further includes guide rollers 65a and 65b supported on support brackets 65c and 65d, similar to the rear trolley 40, described above. The guide rollers 65a and 65b and support brackets 65c and 65d extend from the inner surface of the base member 61 toward the guide track 30.

Figure 14:
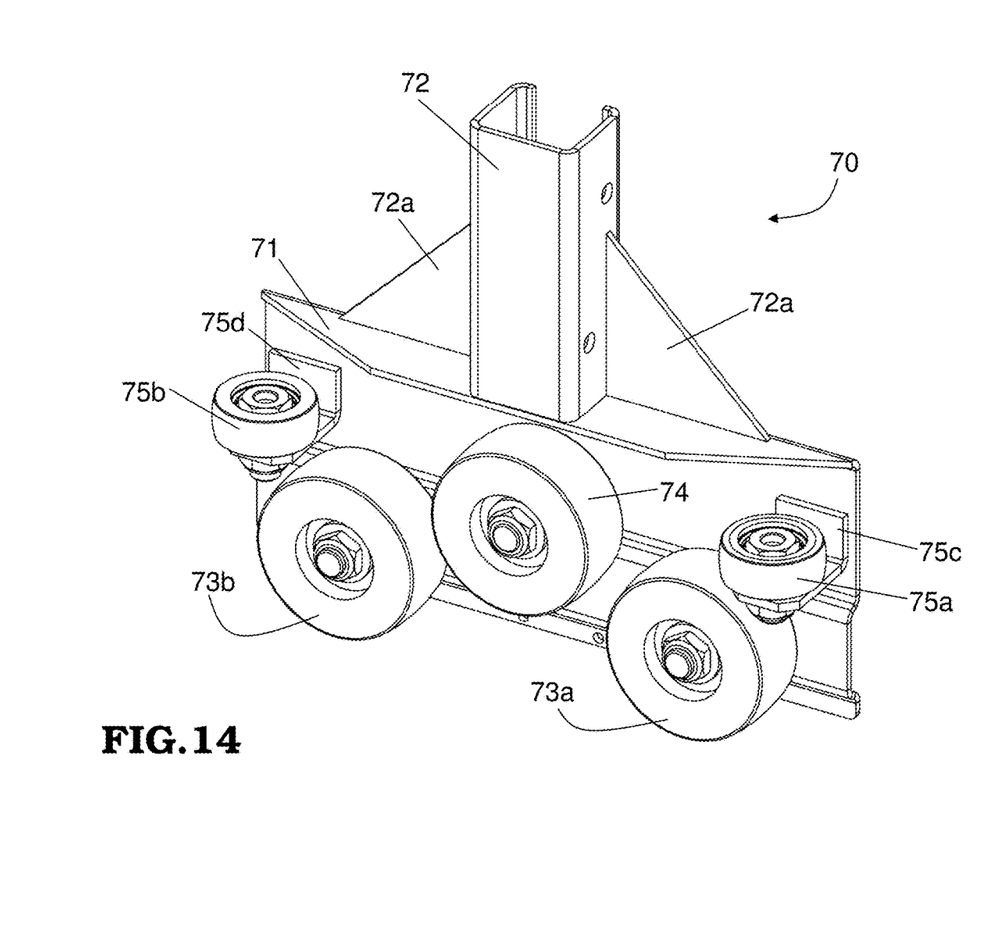
FIG. 14 is a second embodiment of an intermediate trolley assembly similar to the intermediate trolley assembly of FIG. 9.

Referring now to FIG. 14, there is illustrated a second embodiment of an intermediate trolley assembly 70. The illustrated intermediate trolley assembly 70 includes a vertical base member 71. A support member 72 extends upwardly from an upper surface of the base member 71 and may be generally, centrally located along a length thereof. As shown, a pair of angled support brackets or gussets 72a may be included to provide additional support for the support member 72, although such is not required. The intermediate trolley 70 is configured to support an end of the intermediate bow 24, similar to the intermediate trolley 50, described above.

The intermediate trolley 70 further includes a pair of spaced-apart support rollers 73a and 73b that are arranged in a generally coplanar relationship and supported on the base member 71. The support rollers 73a and 73b may be positioned relative to the base member 71 as described above in conjunction with the support rollers 53a and 53b and the base member 51. The support rollers 73a and 73b can be secured to the base member 71 by welded studs, threaded fasteners, or any other support hardware. An intermediate roller 74 is supported on the base member 71. As shown, the intermediate roller 74 is located between the support rollers 73a and 73b along the base member 71. In the illustrated embodiment, the intermediate roller 74 is located a vertical distance above the support rollers 73a and 73b such that the distance between the rollers 73a and 74 is sufficient to engage the spaced-apart inner surfaces of the C-shaped section 31a of guide track 30. Alternatively, the intermediate roller 74 can be aligned in the same vertical plane with the support rollers 73a and 73b, or may extend any other distance from the base member 71. The illustrated intermediate roller 74 has the same diameter as the support rollers 73a and 73b and can be made from a similar material.

The illustrated intermediate trolley assembly 70 further includes a pair of guide rollers 75a and 75b that are similar in function and layout to the guide rollers 55a and 55b of intermediate trolley assembly 50. The illustrated guide rollers 75a and 75b are oriented along a horizontal plane and can each be supported on support brackets 75c and 75d that extend from the base member 71 toward the trailer 10. Alternatively, the support brackets 75c and 75d may be a singular bracket, or a tab that is stamped out of and bent away from the base member 71. The guide rollers 75a and 75b can be secured to the support brackets 75c and 75d using studs, threaded fasteners, or any other support hardware. As shown, the guide rollers 75a and 75b are located a vertical distance above the support rollers 73a and 73b. The illustrated guide rollers 75a and 75b are smaller in diameter than the support rollers 73a and 73b, and intermediate roller 74. However, the guide rollers 75a and 75b can have any dimensions or may be made from any desired material.

The principle and mode of operation of this invention have been explained and illustrated in its preferred embodiment. However, it must be understood that this invention may be practiced otherwise than as specifically explained and illustrated without departing from its spirit or scope. It is further understood that any particular element of one embodiment may be applied in combination with other embodiments and remain within the scope of the invention.

The invention claimed is:

1. A convertible tarp system comprising:
   a guide track configured to be secured to a trailer, the guide track including a lower wall and defining a first width, the lower wall defining a second width that is shorter than the first width; and
   a trolley assembly that is supported on the lower wall for movement along the guide track, the trolley assembly including a pair of support rollers, an intermediate roller, and a pair of guide rollers.

2. The convertible tarp system of claim 1 wherein the guide track includes a channel that supports the trolley assembly for movement, the channel having an external width that is equal to the first width and a recessed portion configured to accommodate one of the support rollers, the intermediate roller, and the guide rollers, the recessed portion having a width that is less than the external width.

3. The convertible tarp system of claim 1 wherein the guide track includes a retaining groove that engages a splash guard, the splash guard providing a shield against debris.

4. The convertible tarp system of claim 3 wherein the splash guard is a flexible splash guard that extends between the guide track and a portion of the trailer.

5. The convertible tarp system of claim 1 wherein the guide track includes a lower flange that defines a sealing space, the sealing space being configured to permit a portion of a tarp covering to extend therein.

6. The convertible tarp system of claim 1 wherein the trolley assembly is an end trolley assembly that includes a base member having a mirror-image characteristic such that the end trolley is configured to be mounted in a plurality of positions on a trailer.

7. The convertible tarp system of claim 2 wherein the guide track includes a wear strip that supports the guide rollers.

8. The convertible tarp system of claim 7 wherein the wear strip is one of a hardened metal and a plastic material, the wear strip being retained against the lower wall of the guide track.

9. The convertible tarp system of claim 8 wherein the wear strip is retained in a groove formed on an upper surface of the lower wall.

10. The convertible tarp system of claim 9 wherein the groove is a dovetail groove and the wear strip is removably retained within the dovetail.

11. A convertible tarp system comprising:
   at least one bow supporting a tarp of a trailer, the tarp and bow providing an enclosure for cargo;
   a guide track having an outer wall and a back wall defining a first width and having a channel that includes a recessed portion having a width that defines an internal width of the guide track without increasing the first width, the guide track further including a lower wall defining a path of movement of the bow, the guide track including a lower flange that cooperates with the lower wall to form a sealing space configured to accept an end portion of at least one of the tarp and the bow such that the cooperating end portion and sealing space reduces accumulation of debris within the enclosure formed by the tarp; and
   a trolley having a pair of spaced apart support wheels that engage the channel and support the bow for longitudinal movement relative to the trailer, the trolley having at least one guide wheel that supports the bow perpendicular to the path of movement.

12. The convertible tarp system of claim 11 wherein the channel of the guide track is a C-shaped channel.

13. The convertible tarp system of claim 11 wherein the lower wall defines a width that is less than a guide track width such that the lower wall is configured to be generally shielded from loading event impacts, the trolley support wheels configured to generally roll on the lower wall during movement of the bow relative to the guide track.

14. The convertible tarp system of claim 13 wherein the lower wall includes a wear strip that contacts the trolley support wheels during movement of the bow.

15. The convertible tarp system of claim 11 wherein the guide rail includes a retaining groove that engages a splash guard, the splash guard providing a shield against debris within the enclosure formed by the tarp.

16. The convertible tarp system of claim 15 wherein the splash guard is a flexible splash guard that extends between the guide track and a portion of the trailer.

17. A covered trailering system comprising:
a flatbed trailer having a deck space configured to accommodate cargo;
a tarp structure configured to cover the deck space, the tarp structure supported by a plurality of bows that support a covering, the covering defining an enclosed cargo space having a variable volume;
a guide track secured to the flatbed trailer, the guide track having a longitudinally extending channel, the channel including an outer wall defining a first width; and
a plurality of trolleys, each trolley supporting at least one of the plurality of bows, the trolleys having a plurality of support wheels and at least one guide wheel, the plurality of support wheels engaging the channel for longitudinal movement relative to the trailer, the at least one guide wheel engaging the outer wall for lateral support of the bows relative to the trailer, and wherein the channel includes a recessed portion configured to accommodate the at least one guide wheels, the recessed portion having a width that increases the internal width of the channel between a back wall of the guide track and an outer wall of the guide track without increasing the first width.

18. The covered trailering system of claim 17 wherein the guide track includes a lower wall that engages the support wheels, the lower wall defining a second width that is less than the outer wall first width, the plurality of trolleys include a pair of end trolleys and at least one intermediate trolley, the pair of end trolleys having a pair of support wheels, a pair of guide wheels and a pair of intermediate wheels, the intermediate wheels engaging the guide track the support wheels are substantially maintained in contact with the lower wall.

19. The covered trailering system of claim 17 wherein the guide track includes a lower wall that engages the support wheels, the lower wall cooperating with a lower flange to define a sealing space, the sealing space being configured to accept an end portion of at least one of a tarp and a bow, the end trolleys support a pair of bows and at least one intermediate trolley supports an intermediate bow for longitudinal movement relative to the guide track, the covering is one of a flexible tarp sheet and a rigid panel.

20. The covered trailering system of claim 17 wherein the guide track includes at least one of a retaining groove that engages a splash guard, the splash guard is a flexible splash guard that extends between the guide track and a portion of the trailer to provide a shield against debris.

* * * * *